US010647265B2

(12) United States Patent
Kelly et al.

(10) Patent No.: US 10,647,265 B2
(45) Date of Patent: May 12, 2020

(54) SWITCH MECHANISM FOR AN ELECTRICALLY ADJUSTED SCREEN MOUNT

(71) Applicant: Bentley Motors Limited, Cheshire (GB)

(72) Inventors: David Kelly, Cheshire (GB); David Alan Rook, Cheshire (GB)

(73) Assignee: Bentley Motors Limited, Cheshire (GB)

(*) Notice: Subject to any disclaimer, the term of this patent is extended or adjusted under 35 U.S.C. 154(b) by 0 days.

(21) Appl. No.: 15/512,731

(22) PCT Filed: Oct. 12, 2015

(86) PCT No.: PCT/GB2015/052991
§ 371 (c)(1),
(2) Date: Mar. 20, 2017

(87) PCT Pub. No.: WO2016/059387
PCT Pub. Date: Apr. 21, 2016

(65) Prior Publication Data
US 2017/0341594 A1 Nov. 30, 2017

(30) Foreign Application Priority Data

Oct. 16, 2014 (GB) .................................. 1418364.4
Oct. 17, 2014 (GB) .................................. 1418415.4

(51) Int. Cl.
B60R 11/02 (2006.01)
B60R 11/00 (2006.01)
(Continued)

(52) U.S. Cl.
CPC .......... B60R 11/0235 (2013.01); B60R 11/02 (2013.01); B64D 11/00151 (2014.12);
(Continued)

(58) Field of Classification Search
CPC .................................................. B60R 11/0235
(Continued)

(56) References Cited

U.S. PATENT DOCUMENTS 5,362,144 A * 11/1994 Shioya .................... B60K 37/02
312/223.1
2005/0140191 A1* 6/2005 Curran ................... B60K 35/00
297/217.3
(Continued)

FOREIGN PATENT DOCUMENTS

CN 101374693 A 2/2009
CN 102869542 A 1/2013
(Continued)

OTHER PUBLICATIONS

International Search Report and Written opinion received in International Application No. PCT/GB2015/052991, dated Feb. 10, 2016, 10 pages.
(Continued)

Primary Examiner — Joseph G Ustaris
Assistant Examiner — Amir Shahnami
(74) Attorney, Agent, or Firm — Adler Pollock & Sheehan P.C.

(57) ABSTRACT

A switch mechanism actuates an electrically adjustable screen mount. The switch mechanism allows a user to select between a first automatic operation for stowing and deployment of the display screen (6), and a second, user adjustable operation for adjustment of the deployed position of the display screen (6), in order to tilt the screen back and forth. The adjustment back and forth may be accompanied by a movement upward or downward, with an upward movement when the top of the screen tilts away from the user, and downward movement when the top of the screen tilts towards the user. This can compensate for tilting of the
(Continued)

surface to which the screen mount is attached, such as a seat-back.

18 Claims, 4 Drawing Sheets

(51) Int. Cl.
    *B64D 11/00* (2006.01)
    *F16M 13/02* (2006.01)

(52) U.S. Cl.
    CPC ............ *F16M 13/022* (2013.01); *B60R 11/00* (2013.01); *B60R 2011/0015* (2013.01); *B60R 2011/0082* (2013.01); *B60R 2011/0092* (2013.01); *B64D 11/00* (2013.01)

(58) Field of Classification Search
    USPC ........................................................ 348/837
    See application file for complete search history.

(56) References Cited

U.S. PATENT DOCUMENTS

| | | |
|---|---|---|
| 2008/0121762 A1 | 5/2008 | Slatosch et al. |
| 2008/0196201 A1 | 8/2008 | Anderson |
| 2009/0008974 A1 | 1/2009 | Hattori et al. |
| 2009/0013357 A1* | 1/2009 | Cassellia ................ B60K 35/00 725/75 |
| 2009/0038422 A1 | 2/2009 | Choi |
| 2009/0085383 A1 | 4/2009 | Hicks et al. |
| 2010/0259078 A1 | 10/2010 | Saito et al. |
| 2011/0063530 A1 | 3/2011 | Karsch et al. |
| 2012/0050626 A1* | 3/2012 | Tsuzuki .............. B60R 11/0235 348/837 |
| 2014/0077576 A1 | 3/2014 | Brawner |

FOREIGN PATENT DOCUMENTS

| | | |
|---|---|---|
| DE | 3223528 A1 | 2/1983 |
| DE | 3723027 C1 | 9/1988 |
| DE | 102009007991 A1 | 8/2010 |
| EP | 0551078 A1 | 7/1993 |
| EP | 1498316 A1 | 1/2005 |
| FR | 2948082 A1 | 1/2011 |
| JP | 2006282100 A | 10/2006 |
| JP | 2009018760 A | 1/2009 |
| JP | 4227173 B2 | 2/2009 |
| JP | 2009137400 A | 6/2009 |
| JP | 2014142468 A | 8/2014 |
| WO | 2005096710 A2 | 10/2005 |

OTHER PUBLICATIONS

International Search Report and Written Opinion received in International Application No. PCT/GB2015/052987, dated Feb. 10, 2016, 11 pages.

* cited by examiner

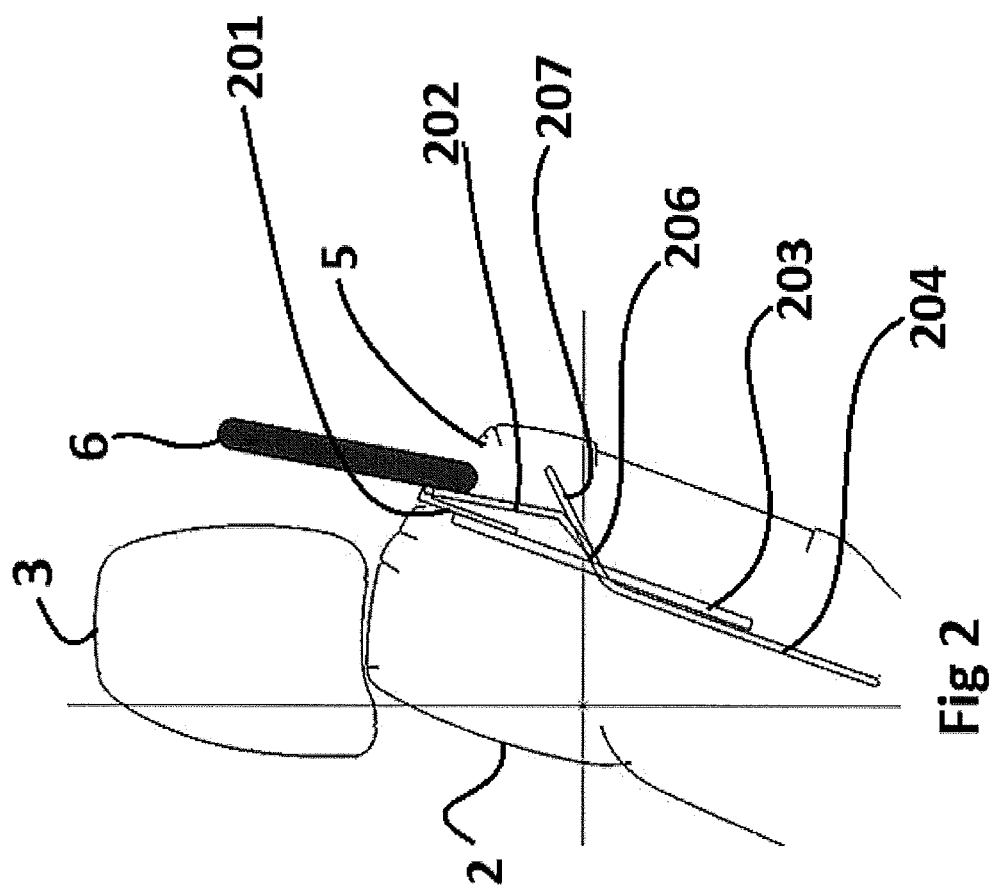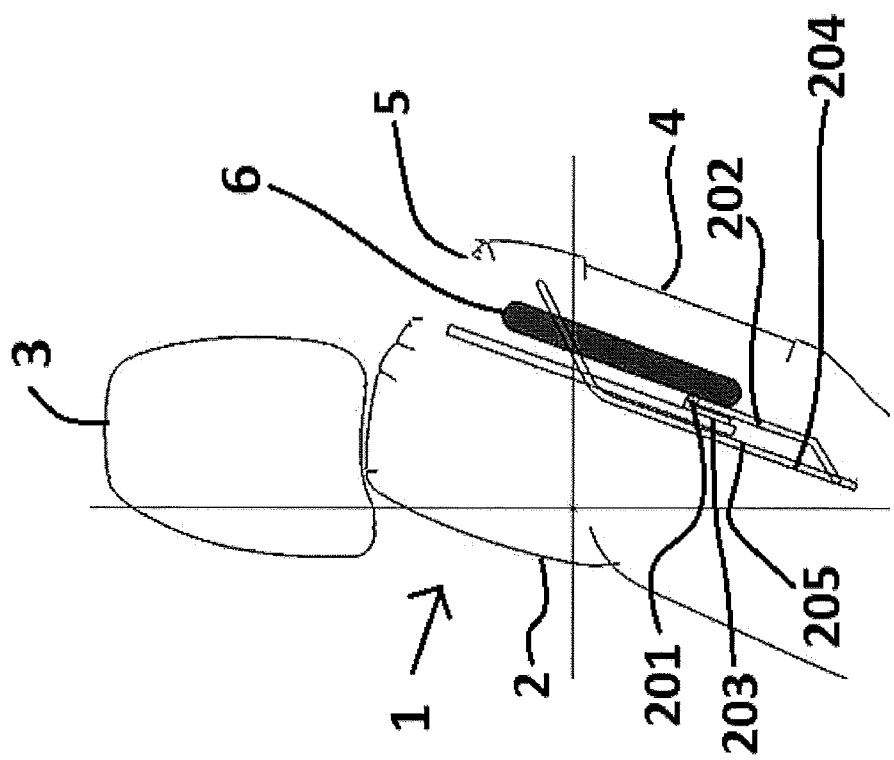

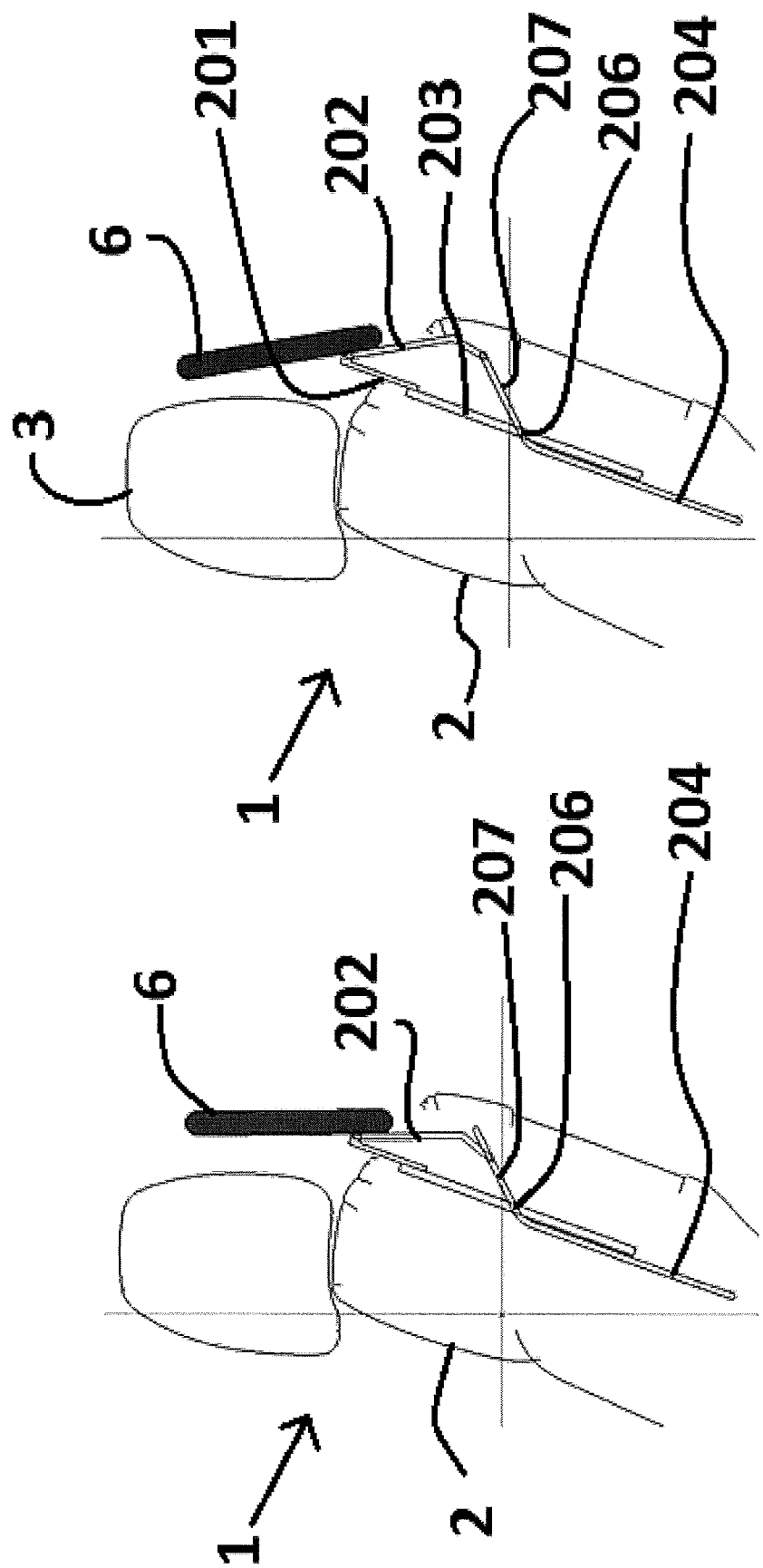

SWITCH MECHANISM FOR AN ELECTRICALLY ADJUSTED SCREEN MOUNT

CROSS REFERENCE TO RELATED APPLICATIONS

This application is a national phase filing under 35 U.S.C. § 371 of International Application No. PCT/GB2015/052991 filed Oct. 12, 2015, which claims priority from Great Britain application number 1418364.4, filed Oct. 16, 2014 and Great Britain application number 1418415.4 filed Oct. 17, 2014, the entire contents of each are hereby incorporated by reference herein.

TECHNICAL FIELD OF THE INVENTION

The present invention relates to a mount for a display screen. In particular the invention relates to a switch for operating a display screen mounted in a seat back and especially for use in automobile seat backs.

BACKGROUND TO THE INVENTION

It is known to mount display screens, such as audio visual display screens and touch screen displays to the rear of vehicle seats. These display screens can be mounted directly to the backrest, or headrest, of a vehicle seat, in a fixed fashion or in which a user (viewer) may adjust the viewing angle of the display by pushing or pulling the display screen about a rotational axis. In some vehicles, such as aircraft and other passenger carrying vehicles, it is known to mount a display screen to an interior surface of the vehicle such as the interior roof surface, and the display screen may be in a fixed position, or mounted such that it may be electrically stowed and rotated from the stowed position into a viewable position as and when required.

In certain vehicles, such as automobiles, it is preferred to mount the screen in a housing in the back of the seat, such that it is out of sight and protected by the housing. A particularly advantageous arrangement has the screen housed flat against the back of the seat, in a housing, from which it extends axially (upwards) out of the housing, into a viewing position. Especially, but not exclusively, in automobiles, where the position and orientation of the seat in which the screen is displayed is adjustable, it is useful to be able to adjust the viewing angle of the screen. US2009/0085383 discloses an example of such a mount, in which the display extends axially from a mount to a deployed position and is pivotally mounted from its top to the top of the support, so that the plane of the display is movable relative to the plane of the display support.

However, this example, whilst effective, suffers certain drawbacks, in particular; the necessity to push the display screen back into position flush with the support before retracting it; and the potential for the display screen to change its position in relation to the pivot and to shake or rattle. Furthermore, although a motorised mechanism is suggested for adjusting the viewing angles, no details are given concerning how this motorisation might work.

Embodiments of the present invention have been made in consideration of these problems, with a view to mitigating or alleviating them.

SUMMARY OF THE INVENTION

According to a first aspect of the invention, there is provided an electrically adjustable display screen mount, comprising a control mechanism operable by a user to select between a first automatic operation for stowing and deployment of the display screen, and a second, user adjustable operation for user adjustment of the deployed position of the display screen; wherein the first automatic deployment operation effects movement between the stowed position and the last used deployment position.

This can allow the initial deployment to be carried out at the press of a button, without holding on, whilst the fine adjustment of the angle can be carried out separately and movement to the last used deployment position is particularly convenient.

The control mechanism may be a switch mechanism, the switch having a deployment memory position in which activation of the switch activates the first automatic operation to effect movement between the stowed position and a last used deployment position.

The switch may have an adjustment mode position which activates the second user adjustable operation so that a user may adjust the deployment position of the display screen.

The adjustment mode position may include two separate functions, one which enables a user to adjust the deployment position of the screen in one direction and another in the opposite direction.

The deployment memory position may include two functions, one which is activated to deploy the display screen in a last used deployment position and the other which is activated to move the display screen to the stowed position.

The switch may comprise a stowing position, a detent corresponding to the adjustment mode position, and a deployment memory position.

The switch may be moved through the detent position into to the deployment memory position in order to deploy the display screen.

The switch may be moved to the detent position in order for a user to adjust the required deployment position of the display screen by way of the second user adjustable operation.

The detent may have two functions, a first function in which the detent position effects movement towards the display screen stowing position, and a second function in which the detent effects movement towards the deployment memory position.

The switch may be moveable in at least two directions, and the stowing position and deployment memory position of the switch may be effected by opposite movement of the switch.

The, user adjustable operation may enable rotation of the display screen up to 15°.

The switch may further comprise a neutral position, to which the switch is urged in absence of any user input.

The first automatic operation may cause the screen to move faster than the second user adjustable operation (to allow for fine adjustment).

A seat may be provided, comprising an electrically adjustable display screen mount as set out above, wherein user adjustment of the deployed position of the screen changes the viewing angle such that the base of a display screen mounted on the display screen mount moves longitudinally away from the back of the seat and/or the top of a display screen mounted on the display screen support moves longitudinally towards a headrest.

Movement of the base longitudinally away from the back of the seat, and/or movement of the top longitudinally towards a headrest may occur simultaneously with axial movement in the deployment direction. This means that in adjusting the angle, upward movement of the screen is accompanied by tilting of the screen such that the base moves towards the user and/or the top moves away from the user—this is particularly useful because when a seat is tilted backwards, its top will be lower and its angle will be towards the user of the screen. Accordingly, extension of the display screen mount results in angling the screen away from the user and lifting it higher, thereby compensating both for the angle and the height of the screen.

Movement of the adjustable display screen mount in the retraction direction may be associated with a corresponding movement of the base of the screen towards the back of the seat, and/or movement of the top of the screen away from the headrest.

The present invention also provides a seat comprising a display screen mount as set out above, mounted in the seat back, for viewing by a passenger in the seat behind. A vehicle comprising such a seat is also provided. The vehicle may be an automobile.

DETAILED DESCRIPTION OF THE INVENTION

In order that the invention may be more clearly understood, embodiments thereof will now be described, by way of example only, with reference to the accompanying drawings, of which:

FIG. 1 shows a cross sectional view of a seat including a display screen mounted on a display screen mount according to the invention, in a stowed position;

FIG. 2 shows a cross sectional view of the seat of FIG. 1 with the display screen mount in a deployed position, set at a forward tilt;

FIG. 3 shows a cross sectional view of the seat of FIGS. 1 and 2 with the display screen mount in a deployed position, set at a neutral tilt;

FIG. 4 shows a cross sectional view of the seat of FIGS. 1 to 3 with the display screen mount in a deployed position, set at a backward tilt;

Figure 6:
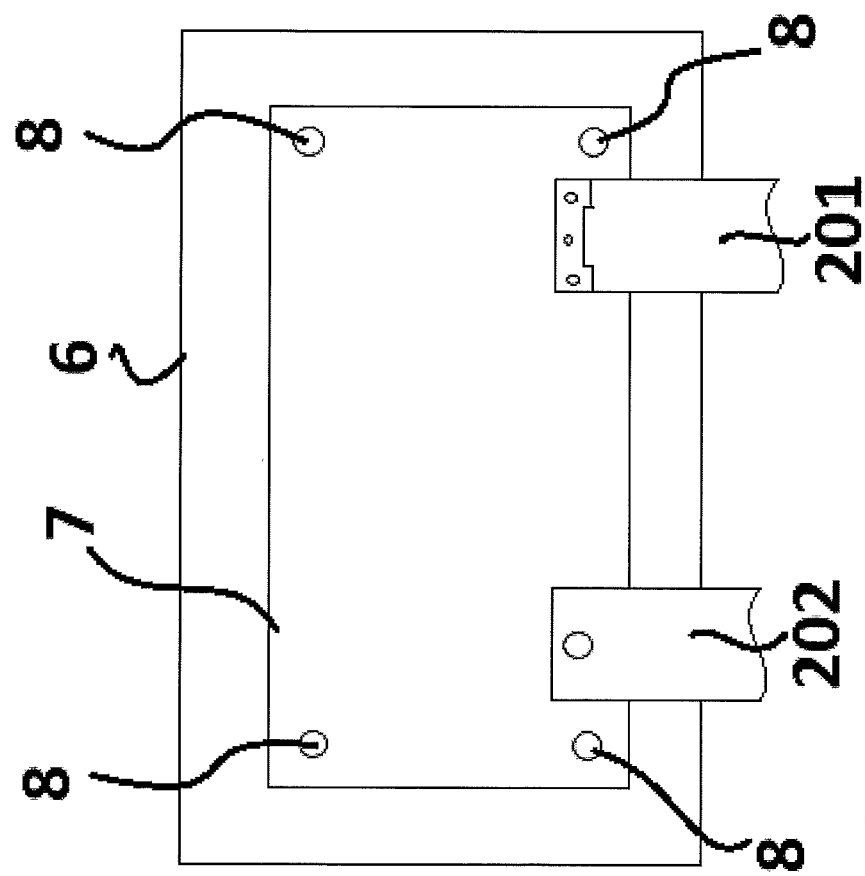
FIG. 6 shows a rear view of the display screen of attached to the screen mount of FIGS. 1-5.
Figure 5:
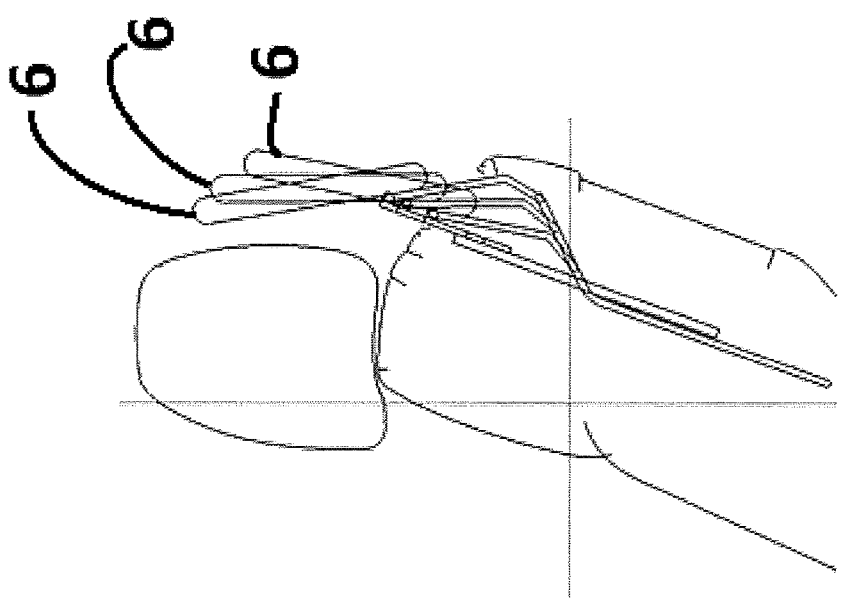
FIG. 5 shows a cross sectional view of the seat of FIGS. 1 to 4 with the display screen mount in the deployed position showing backward, forward and neutral tilts.

With reference to FIGS. 1 to 5, a seat 1 of an automobile (not shown) has a main body portion 2, a headrest 3 and a housing 4 at the rear. The housing 4 has a slot 5 in its upper surface, through which a display screen 6 can move between a stowed position (shown in FIG. 1), within the housing 4, to a deployed position outside the housing 4 (shown in FIGS. 2-5).

As shown in FIG. 6, the display screen 6 is attached to a display screen support 7 e.g. by fastenings 8, e.g. nuts/bolts. The display screen support 7 is pivotally mounted to a first slide 201, via a hinge 9 and fixedly attached to a second slide 202.

Referring once again to FIGS. 1-5, the first slide 201 is slidably mounted at its lower end to a first track 203 e.g. by wheels (not shown), although with suitable materials/lubrication wheels may not be necessary. The first track 203 is linear and extends generally along the axis of the body of the seat 1, parallel to the main plane of the housing 4 which defines the seat back.

The first slide 201 is drivably mounted, for example by a rack and pinion mechanism, or a spindle drive. Indeed, in an alternative embodiment, the first slide 201 could include a rack mechanism, or the spindle and the separate track 203 could be eliminated. Accordingly, when the first slide 201 is driven, it follows the linear path defined by the first track 203. The first slide 201 could even, for example, be the rod of an (e.g. hydraulic) actuator (such as a ram), with the cylinder defining the first track 203.

The second slide 202 is also slidably mounted (e.g. by wheels) at its lower end, this time to a second track 204. The second track 204 is non-linear and is shaped to guide the display screen support 7 as it moves between the deployed and stowed positions. In its lower region, the non-linear second track 204 has a linear portion 205. The linear portion 205 runs parallel to the linear path defined by the first track 203.

In an upper region, best seen in FIGS. 2-4, the second track 204 has a non-linear portion 206, which deviates from the linear path defined by the linear portion 205 in the lower region; the non-linear portion 206 curves away from axis of the linear path, longitudinally, towards the housing 4 and away from the axis of the body 2 of the seat 1. The non-linear portion 206 then straightens up to continue to define a straight path 207, which will be followed by the slide 102, upwards and away from the body 2 of the seat 1. Although it is straight, the path 207 is considered to be non-linear as it does not continue the linear path defined by the linear portion 205 of the second track 204 in its lower region.

In use, to deploy the display screen 6 from the stowed position shown in FIG. 1, an electric switch 60 (shown in FIGS. 7A to 7D) is actuated. This causes the first slide 201 to be driven along the linear path defined by the first track 203. The non-driven second slide 202 is thus caused to follow a linear path along the linear portion 205 of the non-linear second track 204. This linear path is followed as the display screen 6 emerges from the slot 5 in the housing 4.

Then, when the display screen 6 has almost entirely emerged from the slot, 5 the lower end of the second slide 202, which is slidably connected to the second track 204 reaches the non-linear portion 206. The first slide 201 continues to follow a linear motion, driving the display 6 upwards. However, the lower end of the second slide 202 follows a non-linear path, curving away from the axis of the body 2 of the seat 1. Because the display support 7 is pivotally mounted to the first slide 201 and fixedly mounted to the second slide 202, this movement causes the support 7 to it pivots about the hinge 9, with the result that the base of the display support 7 (and the display 6) moves longitudinally away from the axis of the body 2 of the seat 1. Correspondingly, the top of the display tilts towards the axis of the body 2, and towards the headrest.

FIG. 2 shows the configuration of the display screen 6 and its mount when this tilting action has just begun, with the lower end having travelled round the curved region of the non-linear portion 206 onto the start of the straight path 207. In this position, where the second slide has not travelled far along the straight path 207 making up part of the non-linear portion 206, the display screen is almost parallel with the axis of the linear first track 203. Since the axis of the body 2 of the seat 1 is leaning backwards, the top of the screen is tilted backwards with respect to the seat 1, or at a forward tilt, with respect to the user.

As the first slide 201 is driven along the linear path defined by the first track 203, the lower end of the second slide 202 continues up the straight path 207 in the non-linear portion 206 of the second track 204, it eventually reaches the end of the path 207 at its uppermost and longitudinally furthest from the body 2 of the seat 1 (closest to the housing 4) as shown in FIG. 4. At this point, the second slide 202 is at its greatest angle with respect to the first slide 201 and therefore, the display 6 is angled backward, with its top closest to the headrest and its base further from the axis of the body 2 of the seat 1, towards the user.

In between the forward tilt shown in FIG. 2 and the backward tilt shown in FIG. 4, when the first slide 201 is not fully extended, the second slide is positioned between the curved portion of the non-linear region 206 and the end of the straight path 207. Accordingly, a neutral position can be defined, e.g. halfway along the straight path, in which the angle of the display is roughly in line with the axis of the headrest, and most likely to be at a suitable viewing angle to an average sized rear-seat passenger, if the seat 1 is occupied by an average sized occupant in an ordinary position (e.g. height and orientation of the seat body.

Backrests of seats are normally rotatably mounted at their base. Accordingly, leaning back the seat body 2 lowers the height of the slot 5 through which the display screen 6 exits the housing 4. On the other hand, leaning forward towards a straight upright position raises the height of the slot.

The display screen 6 exits the slot in a plane parallel to the axis of the seat body 2. Therefore, it too is leant backward with respect to the seat i.e. tilted forward with respect to the viewer. Accordingly, when the seat 1 is leant back, the user (viewer) is likely to wish to tilt the display screen 6 backwards (that is to say, to lean the top of the screen in the direction of the back of the screen, away from the viewer). This is achieved by extending the first slide 201 as far as possible, which also raises the height, therefore both bringing about the correct angle and adjusting towards a better height.

In use, a user wishing to deploy the screen 6 from the stowed position as shown in FIG. 1, to a deployed position as shown in FIGS. 2 to 5 may manipulate a switch 60 as shown in FIGS. 7A-7D in order to activate the electric drive. At this point, the first slide 201 is driven upwards along the linear path defined by the first track 203, which causes the second slide 202 to be driven along the second track 204. As the slides 102, 202 are moved along the tracks 203, 205, the display screen 6 is moved upwards and follows the path described above, as the second slide 202 reaches the non-linear portion of the second track 204.

In a new installation of a seat 1 and display screen 6 in a vehicle, for example, the support 7 and hence display screen 6 may be provided with a default deployment memory position, this may be the neutral position as shown in FIG. 3, in which it is expected that the seat 1 is upright and the height of the passenger behind the seat is such that the screen is at eye level. The position of the display screen 6 may not be optimal, especially if the body 2 of the seat 1 is moved to a different position, e.g an especially upright, or unusually laid back position, in which case, for an average height viewer, the orientation of the display screen 6 would need to be reclined towards the "forward tilt" and inclined towards the "backward tilt" positions shown in FIGS. 2 and 4 respectively.

Figure 7A:
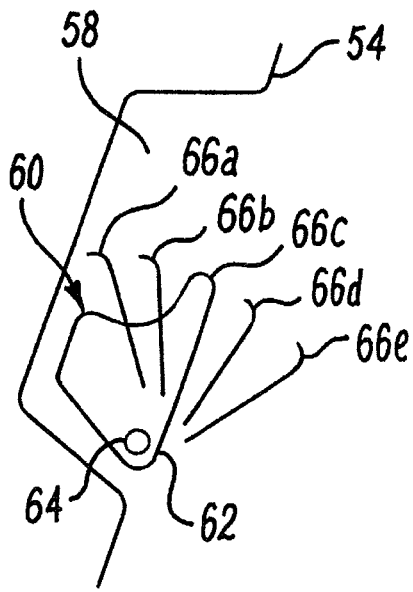
FIG. 7A illustrates a side view of a switch mechanism for the display screen mount of FIGS. 1-6, in a neutral position.
Figure 7B:
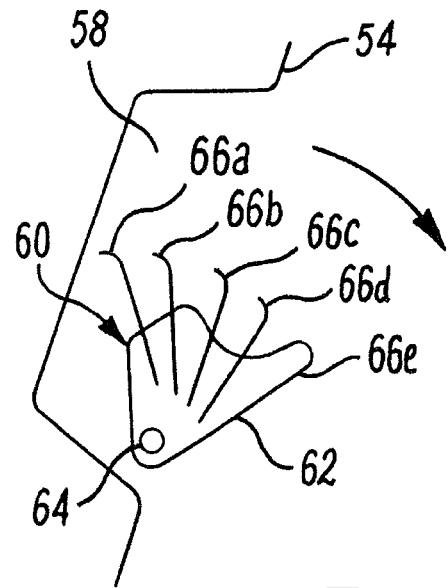
FIG. 7B illustrates the switch mechanism in a deployment memory position.
Figure 7C:
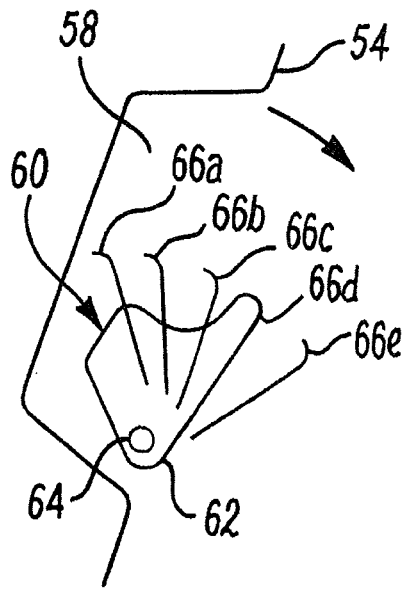
FIG. 7C illustrates the switch mechanism in a reclining adjustment position.
Figure 7D:
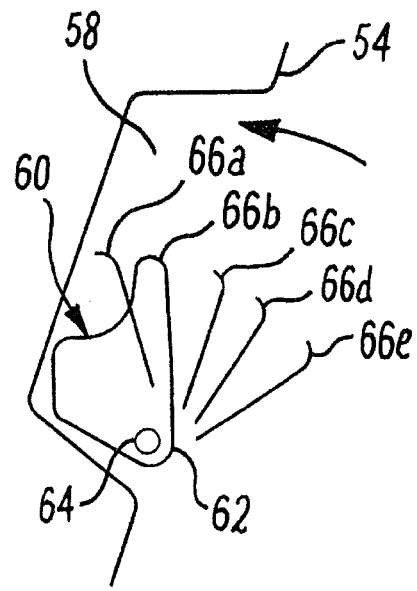
FIG. 7D illustrates the switch in an inclining adjustment position.

As shown in FIGS. 7A-7D, the seat 1, or another part of the vehicle (not shown), e.g. an armrest (not shown) is provided with a switch 60 which enables adjustment of the deployment position of the display 6 by a user. The switch 60 is a rocker switch having five positions 66a, 66b, 66c, 66d, 66e, corresponding to the stowing position 66a, a inclining detent 66b, a neutral position 66c, a reclining detent 66d and a deployment memory position 66e. The switch 60 is manipulated by a user, who can move the switch between all of the positions. In use the switch 60 is urged to the neutral position 66c shown in FIG. 7A, unless a user manipulates the switch 60. A user may move the switch 60 in one direction, through the reclining detent 66d to the deployment memory position 66e as shown in FIG. 7B. A user may also move the switch 60 through the inclining detent 66b to the stowing position 66a in the opposite direction. A user may also move the switch 60 to the reclining detent 66d, as shown in FIG. 7C, in order to adjust the deployment position of the display 6 in one direction, and to the inclining detent 60b, to move the display position in the opposite direction as shown in FIG. 7D. The deployment memory position 66e, when activated, effects the default position of the deployment of display 6 as shown in FIG. 3, and the stowing position 66a when activated, effects the stowed position of display 6 as shown in FIG. 1, the display being entirely situated beneath the slot 5 in the housing 4 of the seat 1.

The inclining and reclining detents 66b, 66d between the stowing position and deployment memory position have respective functions, the reclining detent 66d enables the user to adjust the position of the display 6 in a forward (and downward) direction towards user in the position shown in FIG. 2, and the inclining detent 66b enables a user to adjust the position of the display in a backward (and upward) direction towards the position shown in FIG. 4 away from the user. In use, a user may activate either detent 66b, 66d of the switch 60, which activates the electric drive to drive the first slide 201 in the required direction, in order to adjust the position of the display screen 6 relative to the seat 9 and the user. When the required position has been achieved, a user may release the switch 60 which moves back to the neutral position 66c, so that the display screen 6 remains in the desired position. At this point, suitable electronic means may store the data of the new display screen deployment position, and seat position as the new default deployment memory position. A user may then stow the display screen 6 when required, by moving the switch 60 to the stowing position 66a. When the user next utilises the display screen 6, moving the switch 60 to the deployment memory position 66e will automatically move the display screen 6 to the last known deployment memory position and user may adjust the display screen 6 again as necessary.

When the switch is moved to the deployment memory position 66e, or the stowing position 66a, the display screen 6 is caused to move at a first, relatively fast, speed, on the other hand, when the switch is moved to the inclining detent 66b, or the reclining detent 66d, the display screen 6 is caused to move at a second, relatively slow, speed, in order to achieve fine adjustment.

The above embodiment is/embodiments are described by way of example only. Many variations are possible without departing from the scope of the invention as defined in the appended claims.

The invention claimed is:
1. An electrically adjustable display screen mount, comprising a control mechanism configured as a switch operable by a user between and having at least five positions corresponding to a stowing position, an inclining detent, a neutral position, a reclining detent and a deployment memory position, the stowing position of the switch and deployment memory position of the switch operating the display screen mount in a first automatic operation for stowing of the display screen in a stowed position and deployment of the display screen from the stowed position to an initial deployment position corresponding to a last used deployment position prior to stowage, and the inclining detent of the switch and the reclining detent of the switch operating the display screen mount in a second, user adjustable operation for user adjustment of the initial deployment position of the display screen into a final deployment position;

wherein the first automatic deployment operation effects movement of the display screen between the stowed position and the initial deployment position at a speed which is faster than the second, user adjustable operation effected by selection of the inclining detent of the switch or the reclining detent of the switch.

2. The electrically driven stowable and deployable display screen mount as claimed in claim 1 wherein the adjustment mode position includes two separate functions, one which enables a user to adjust the deployment position of the screen in one direction and another in the opposite direction.

3. The electrically driven stowable and deployable display screen mount as claimed in claim 1 wherein the deployment memory position includes two functions, one which is activated to deploy the display screen in a last used deployment position and the other which is activated to move the display screen to the stowed position.

4. The electrically driven stowable and deployable display screen mount as claimed in claim 1 wherein the switch comprises a stowing position, a detent corresponding to the adjustment mode position, and a deployment memory position.

5. The electrically driven stowable and deployable display screen mount as claimed in claim 1 wherein the switch is moved through the detent position into to the deployment memory position in order to deploy the display screen.

6. The electrically driven stowable and deployable display screen mount as claimed in claim 1 wherein the switch is moved to the detent position in order for a user to adjust the required deployment position of the display screen by way of the second user adjustable operation.

7. The electrically driven stowable and deployable display screen mount as claimed in claim 1 wherein the detent has two functions, a first function in which the detent position effects a tilting movement in one direction, and a second function in which the detent effects tilting movement in the opposite direction.

8. The electrically driven stowable and deployable display screen mount as claimed in claim 4 wherein the switch can be moved in at least two directions, and the stowing position and deployment memory position of the switch is effected by opposite movement of the switch.

9. The display screen mount according to claim 1 wherein the user adjustable operation enables rotation of the display screen up to 15°.

10. An electrically driven stowable and deployable display screen mounted on a support structure, comprising a control mechanism operable by a user to select between a first automatic operation for stowing and deployment of the display screen from the stowed position to an initial deployment position corresponding to a last used deployment position prior to stowage, and a second, user adjustable operation for user adjustment of the initial deployment position of the display screen into a final deployed position;

wherein the first automatic deployment operation effects automatic movement between the stowed position and the initial deployment position wherein, the first automatic deployment operation is configured to cause the screen to move faster than the second user adjustable operation.

11. A seat comprising an electrically adjustable display screen mount according to claim 1, wherein user adjustment of the deployed position of the screen changes the viewing angle such that the base of a display screen mounted on the display screen mount moves longitudinally away from the back of the seat and/or the top of a display screen mounted on the display screen support moves longitudinally towards a headrest.

12. The seat according to claim 11 wherein movement of the base longitudinally away from the back of the seat, and/or movement of the top longitudinally towards a headrest occurs simultaneously with axial movement in the deployment direction.

13. The seat comprising a display screen mount according to claim 1 mounted in the seat back, for viewing by a passenger in the seat behind.

14. The vehicle comprising a seat according claim 11.

15. The vehicle according to claim 14, the vehicle being an automobile.

16. An electrically adjustable display screen mount, comprising a control mechanism operable by a user to select between a first automatic operation for stowing and deployment of the display screen from the stowed position to an initial deployment position corresponding to a last used deployment position prior to stowage, and a second, user adjustable operation for user adjustment of the initial deployment position of the display screen into a final deployed position, the first automatic operation configured to cause the display screen to move faster than the second user adjustable operation;

wherein the first automatic deployment operation initially effects movement between the stowed position and the initial deployment position and each time thereafter, following user adjustment of the initial deployment position of the display screen using the second, user adjustable operation into a final deployed position, stores the display screen final deployed position as a new deployment memory position, such that when a user next utilises the display screen, it will automatically move the display screen to the new initial deployment position.

17. The electrically driven stowable and deployable display screen mount, as claimed in claim 1, wherein the switch further comprises a neutral position, to which the switch is urged in absence of any user input.

18. The seat according to claim 11 wherein movement of the adjustable display screen mount in the retraction direction is associated with a corresponding movement of the base of the screen towards the back of the seat, and/or movement of the top of the screen away from the headrest.

\* \* \* \* \*